(12) United States Patent
Margerie

(10) Patent No.: US 6,749,516 B2
(45) Date of Patent: Jun. 15, 2004

(54) CONSTANT VELOCITY JOINT AND MECHANICAL TRANSMISSION MEMBER FOR SAME

(75) Inventor: Michel Margerie, Vetheuil (FR)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 10/239,036

(22) PCT Filed: Dec. 13, 2001

(86) PCT No.: PCT/FR01/03986

§ 371 (c)(1),
(2), (4) Date: Sep. 18, 2002

(87) PCT Pub. No.: WO02/059492

PCT Pub. Date: Aug. 1, 2002

(65) Prior Publication Data

US 2003/0078107 A1 Apr. 24, 2003

(30) Foreign Application Priority Data

Jan. 23, 2001 (FR) ............................................. 01 00867

(51) Int. Cl.[7] ............................................... F16D 3/205
(52) U.S. Cl. ..................... 464/111; 464/124; 464/905
(58) Field of Search .................... 464/111, 123, 464/124, 905, 132; 384/25, 26, 29, 35, 275

(56) References Cited

U.S. PATENT DOCUMENTS

| 5,061,223 A | * | 10/1991 | Kadota et al. ............... 464/111 |
| 5,203,741 A | | 4/1993 | Turner, et al. |
| 5,330,389 A | | 7/1994 | Jost et al. |
| 5,376,049 A | * | 12/1994 | Welschof et al. ............ 464/111 |
| 5,391,013 A | * | 2/1995 | Ricks et al. ............. 464/111 X |
| 5,474,500 A | * | 12/1995 | Girguis ........................ 464/111 |

FOREIGN PATENT DOCUMENTS

| JP | 63186036 | 8/1988 |
| JP | 10220489 | 8/1998 |

* cited by examiner

Primary Examiner—Greg Binda

(57) ABSTRACT

A constant velocity transmission joint having a male element (10) having a plurality of arms (14); a female element (20) defining a pair of facing tracks (22, 23) for each arm (14), which tracks are situated on opposite sides of the arm; and, mounted on each arm, a mechanical transmission member (30) that is movable in the longitudinal direction of the pair of tracks (22, 23), being held axially by the tracks, and establishing a connection with the arm that is swiveling and axially movable along the axis (Y—Y) of the arm. The transmission member includes a circularly symmetrical outer roller placed between the corresponding tracks to roll on one or other of them. For each arm, the outside profile in meridian half-section of the outer roller (32) comprises two arcs (32A, 32B) having curvature of the same sign and cooperating with two arcs (22A, 22B) of the substantially complementary profile of the associated tracks (22, 23) so as to form two spaced-apart contact zones (37A, 3TB). The invention is applicable to constant velocity joints for motor vehicle transmissions.

12 Claims, 4 Drawing Sheets

CONSTANT VELOCITY JOINT AND MECHANICAL TRANSMISSION MEMBER FOR SAME

BACKGROUND OF THE INVENTION

The present invention relates to constant velocity transmission joints having a male element having a plurality of arms, a female element defining a pair of facing tracks for each arm, the tracks being situated on opposite sides of the arm, and mounted on each arm, a mechanical transmission member. The mechanical transmission member is moveable along the longitudinal direction of the pair of tracks and establishes a connection with the arm that is swivelling and axially moveable along the axis of the arm. The mechanical transmission members each include a circularly symmetrical outer roller disposed between the corresponding tracks.

The invention applies in particular to constant velocity joints for motor vehicle transmissions.

In the text below, the terms "axial" and "radial" are used relative to the axis of the arm in question. Similarly, the terms "inner" and "outer" are used relative to the axis of revolution of the outer roller, said axis coinciding with that of the arm for a joint bent at a deflection angle of zero.

In the field of such joints, it is known that each arm of the male element moves relative to the corresponding pair of tracks in reciprocating translation along the axis of the arm. Those movements are inevitable because of the structural geometry of the joint. They result from the way the joint operates when there is a deflection angle between the two shafts coupled together by the joint, and they also come from the "offset" phenomenon which consists in orbital movement performed by the center of the male element at a frequency which is three times the frequency of rotation of the joint.

When transmitting torque, friction causes those movements to generate an axial component of the drive force which gives rise to a reciprocating tilting force to which each outer roller is subjected, with the outside surfaces of the rollers generally being toroidal. That force tends to cause the outer roller to oscillate about its point of contact with the track on which it is running. The portion of the outside surface of the roller that is diametrically opposite its portion that is applying pressure then oscillates strongly relative to the surface of the tracks against which the roller is not applying pressure, thus reducing the transmission efficiency of the joint.

Those oscillations also generate a high level of noise which is disagreeable for the user. They also require the surface hardness of the zones of the tracks that are subject to oscillating contact with the roller to be reinforced by appropriate surface treatments, which treatments are often complex because of the shape of the female element. Finally, those oscillations run the risk of an outer roller becoming jammed at the ends of the track.

SUMMARY OF THE INVENTION

An object of the present invention is to provide a constant velocity transmission joint of the type mentioned in which any oscillating motion of the outer roller is prevented by means that are simple, thereby imparting remarkable stability to the roller.

According to the invention, this object is achieved by a constant velocity transmission joint of the type specified wherein, for each arm, the outside profile in meridian half-section of the outer roller comprises two arcs having curvature of the same sign cooperating with two substantially complementary arcs of the associated track to form two spaced-part contact zones, each contact zone defining a contact resultant that is substantially perpendicular to the axis of the outer roller.

In various embodiments of the invention, the arcs of the roller may be convex or circular. The outside profile of the roller may also be symmetrical about a midplane of the roller. In another aspect of the invention, the transmission member includes an inner ring disposed inside the outer roller and a coupling mechanism for coupling the inner ring and outer roller together. The inner ring allows only relative pivoting between the inner ring and the outer roller about a common axis of revolution, and the inner ring is mounted to swivel and slide relative to the arm. In one aspect, the inner ring is mounted to swivel inside the outer roller. In another aspect, the inner ring is mounted to slide on the arm along a common axis of revolution, and the inside surface of the roller and outside surface of the ring are spherical and substantially complementary. In another example, the inner ring is slidable relative to the outer roller along the axis of revolution of the roller, and the inner ring is prevented from moving axially relative to the arm.

In another embodiment, the outer roller includes two juxtaposed portions each presenting in meridian half-section an outside profile which includes one of the two arcs of the outer roller. In a further embodiment, each portion of the outer roller includes an inwardly-directed end shoulder on its inside face about the axis of the roller, the two shoulders defining between them, a cavity for receiving the coupling mechanism.

The invention also provides a transmission member for a constant velocity transmission joint as defined above.

BRIEF DESCRIPTION OF THE DRAWINGS

The invention will be better understood upon reading the following description given purely by way of example and made with reference to the drawings, in which.

DETAILED DESCRIPTION OF THE INVENTION

Figures 1, 1A:
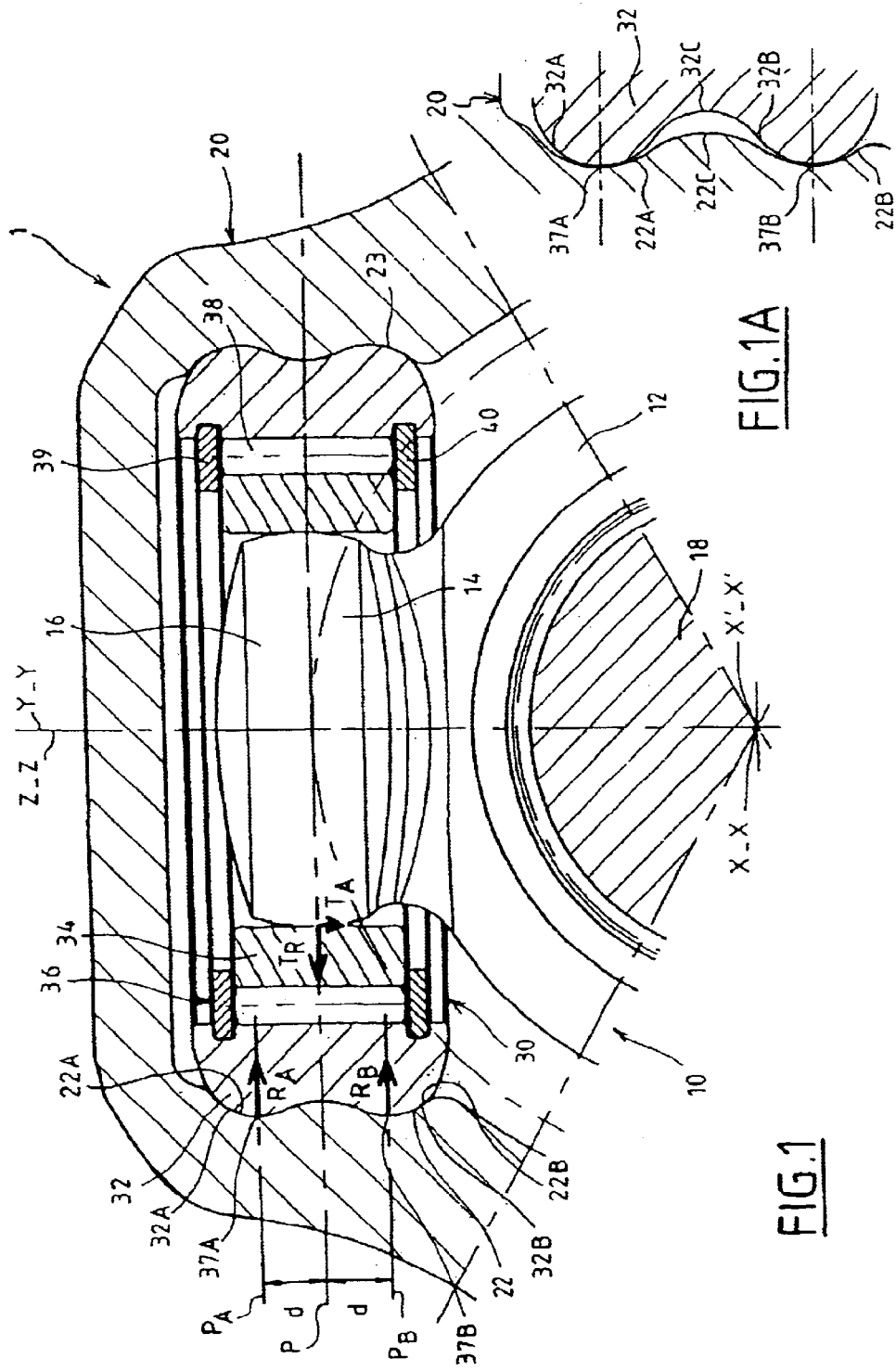
FIG. 1 is a fragmentary cross-section view of a tripod-type constant velocity transmission joint of the invention, when in the straight position.
FIG. 1A shows a detail of FIG. 1.

FIG. 1 shows a fragment of a tripod-type constant velocity joint 1 in a first embodiment of the invention that essentially comprises the following parts.

Firstly, the joint 1 comprises a male, spider element or "tripod" 10 having three-way symmetry about a central axis X—X that is orthogonal to the plane of FIG. 1, the element comprising a hub 12 and three radial arms 14 angularly spaced apart at 120°, with only one arm being shown. The end portion of each arm 14 forms a trunnion 16 of spherical shape centered on the axis Y—Y of the arm. The tripod 10 is secured to a first shaft 18.

Thereafter, the joint 1 comprises a female, race element or "tulip" 20 having three-way symmetry about a central axis X'—X', said axis coinciding with the axis X—X when the joint shown is in its straight or aligned position. On either side of each arm 14, the tulip presents two facing tracks 22 and 23. The tulip is secured to a second shaft (not shown).

Finally, for each arm 14, the joint 1 has a mechanical transmission member 30 held axially by the pair of tracks 22, 23. The mechanical transmission member 30 comprises an outer roller 32 for rolling on one or other track 22, 23, an inner ring 34 placed inside the outer roller 32, and a coupling mechanism 36 for coupling together the inner ring 34 and the outer roller 32. The roller 32 presents an axis of revolution Z—Z that coincides with the axis Y—Y in FIG. 1.

Since the three mechanical transmission members 30 are identical, and since the tripod 10 and the tulip 20 have three-way symmetry, only the portion of the joint 1 that is shown in FIG. 1 is described in greater detail.

The mechanical transmission member 30 establishes a swiveling and moving connection about the axis Y—Y of the arm 14 where it maintains contact between the inside surface of the inner ring 34 and the outside surface of the trunnion 16. The inner ring 34 thus rotates, tilts, and slides about the arm 14.

The transmission member 30 can also move in the longitudinal direction of the pair of tracks 22, 23, i.e. in the direction perpendicular to the plane of FIG. 1.

In meridian half-section, e.g. in the left half-plane relative to the axis Z—Z in FIG. 1, the outer roller 32 presents an outside profile comprising two convex circular arcs 32A, 32B, while the corresponding track 22 presents an inside profile comprising two concave circular arcs 22A, 22B that are substantially complementary to the convex arcs 32A, 32B of the outside profile of the roller 32. At these arcs, for each direction in which the joint can be driven, the roller 32 and the associated track 22 forms two contact zones 37A, 37B presenting respective resultants $R_A$, $R_B$ that are substantially perpendicular to the axis Z—Z of the roller. These contact zones 37A, 37B are situated at the bottoms of the two arcs 22A and 22B of the inside profile of the track 22, so they are spaced apart from each other.

More precisely (FIG. 1A), the arcs 32A and 32B are of a radius that is slightly smaller than the radius of the arcs 22A and 22B, and the concave arc 32 interconnecting the arcs 32A and 32B is of radius that is small enough to ensure that there is no contact with the convex arc 22C interconnecting the arcs 22A and 22B. The differences of radius are exaggerated in FIG. 1A in order to clarify the drawing. The arcs 32A and 32B can have equal radii, and the arcs 22A and 22B can have equal radii as shown.

The coupling mechanism 36 between the inner ring 34 and the outer roller 32 comprises a circular set of needles 38 disposed between the outside cylindrical surface of the inner ring 34 and the inside cylindrical surface of the outer roller 32, together with two flat bearing washers 39 and 40 placed on either side of the ring 34 and of the set of needles 38. The periphery of each bearing washer 39, 40 is received in an annular groove formed in the inside surface of the outer roller.

Ignoring operating clearances, this coupling mechanism 36 thus allow solely for relative rotation between the outer roller 32 and the inner ring 34 about the axis Z—Z.

The joint 1 operates as follows.

Under the effect of drive torque applied to the shaft 18 and assumed to be in a counterclockwise direction in FIG. 1, the arm 14 applies a transmission force T to the mechanical transmission member 30. The point of application of this force is the contact point between the trunnion 16 of the arm 14 and the inner ring 34 of the member 30. This force comprises a radial component $T_R$ that results directly from applying the drive torque as applied to the shaft 18, plus an axial component $T_A$ along the axis Z—Z that results from friction between the outside surface of the trunnion 16 and the inside surface of the inner ring 34. This friction is generated by the relative sliding motion between the trunnion 16 and the ring 34 whenever the joint is operating at a non-zero deflection angle, and to the "offset" orbital motion of the axis X—X of the male member 10, as mentioned above.

The radial component $T_R$ of the force is transmitted to the female element 20 via the contact zones 37A and 37B maintained between the outer roller 32 subjected to the radial component $T_R$ and the associated track 22 of the female element 20.

The axial component $T_A$ of the transmission force, whose nominal value is conventionally about one-tenth that of the radial component $T_R$, generates a force that tends to tilt the transmission member 30. However, this force is taken up in full by the track 22 of the female element via the contact zones 37A and 37B maintained between the roller 32 and the track 22.

The resultants $R_A$ and $R_B$ in each contact zone remain perpendicular to the axis Z—Z of the roller, and the distance d of each contact zone from the midplane P of the tracks 22 and 23 is selected to be sufficient to ensure that the point of application of the force $T_R$ remains permanently in the volume which is defined between the two parallel plans planes $P_A$ and $P_B$ that are both perpendicular to the axis Z—Z and that contain the respective centers of the contact zones 37A and 3B.

Thus, under the effect of driving torque, the mechanical transmission member 30 has the ability, in terms of freedom of movement, only to roll along said tracks and to slide along the longitudinal axis of said pair of tracks.

The invention thus makes it possible to ensure that the transmission member 30 is stable, preventing it from performing, relative to the corresponding pair of tracks, any movement in translation along the axis Z—Z of the outer roller 32, any movement in rotation about the longitudinal axis of said pair of tracks, and any movement in rotation about an axis perpendicular to the axis Z—Z.

Since the stability of the outer roller 22 is improved, vibration level and transmission efficiency of the joint are improved. Similarly, the surface treatments that are essential in prior art joints for reinforcing the surface hardness of certain zones of the female element are no longer necessary.

A variant (not shown) of this first embodiment consists in placing an outer roller whose outside profile has two concave arcs so as to engage a track whose inside profile presents two convex arcs that are substantially complementary thereto.

Figure 2:
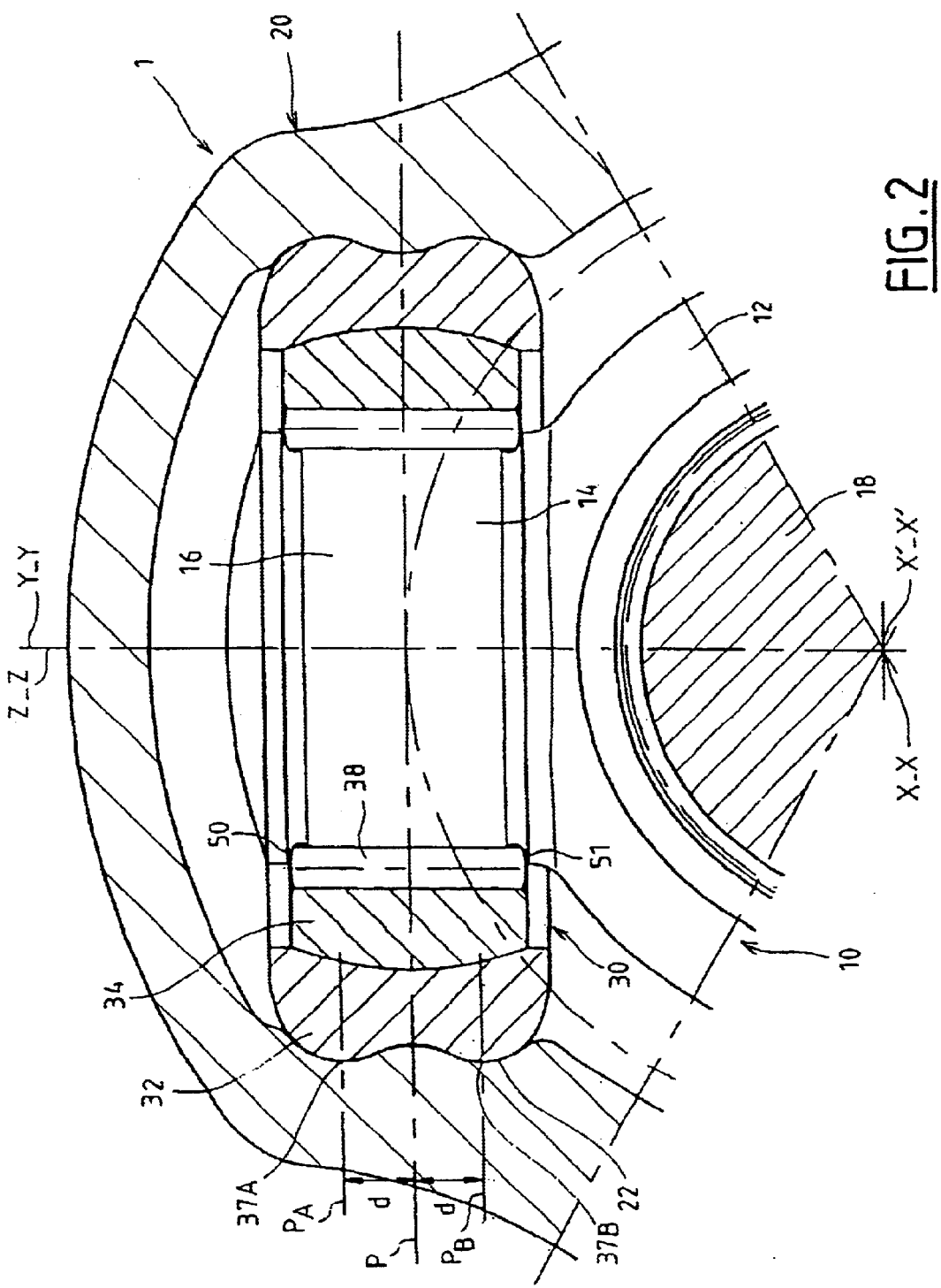
FIGS. 2 to 4 are views analogous to FIG. 1, each showing a particular embodiment of a tripod-type constant velocity transmission joint of the invention.

Another embodiment of a joint 1 of the invention is shown in FIG. 2.

The joint 102 has the same elements as in the first embodiment, except for the following differences.

Firstly, on the tripod element 110, the trunnion 116 of the arm 114 is substantially cylindrical about the axis of revolution Y—Y.

Secondly, the mechanical transmission member 130 comprises a coupling mechanism between the inner ring 134 and the arm 114. This coupling mechanism includes a circular set of needles 38 that are held radially by two shoulders 50 and 51 on either side of the trunnion 116. The coupling mechanism thus allows relative pivoting along the axis Y—Y and movement in translation along said axis between the inner ring 134 and the arm 114.

In addition, the inside surface of the outer roller 132 is substantially spherical and co-operates with the spherical surface of the inner ring 134 which is of complementary spherical profile, thus allowing swiveling movement only between the outer roller 132 and the inner 134.

This second embodiment operates in a manner analogous to that described above.

The force T to be transmitted from the arm 114 is applied along a line of contact between the outside surface of the trunnion 116 and the inside surface of the set of needles 38. The inner ring 134 is then subjected to this force, and because of its substantially spherical outside profile, it takes up a position in the bottom of the curvature of the complementary inside surface of the roller 132, thus bringing the zone of application of the force to be transmitted towards the outside of the joint at the contact zone it maintains with the outer roller 132, i.e. a zone that amounts to a small spot.

The force then transmitted to the outer roller 132 by this pressure thus presents a radial component $T_R$ as described above and an axial component $T_A$ that is fully taken up by the two contact zones 137A, 137B maintained between the roller 132 and the corresponding track 22. The point of application of the force $T_R$ is contained in the volume lying between the two above-defined planes $P_A$ and $P_B$.

Figure 3:
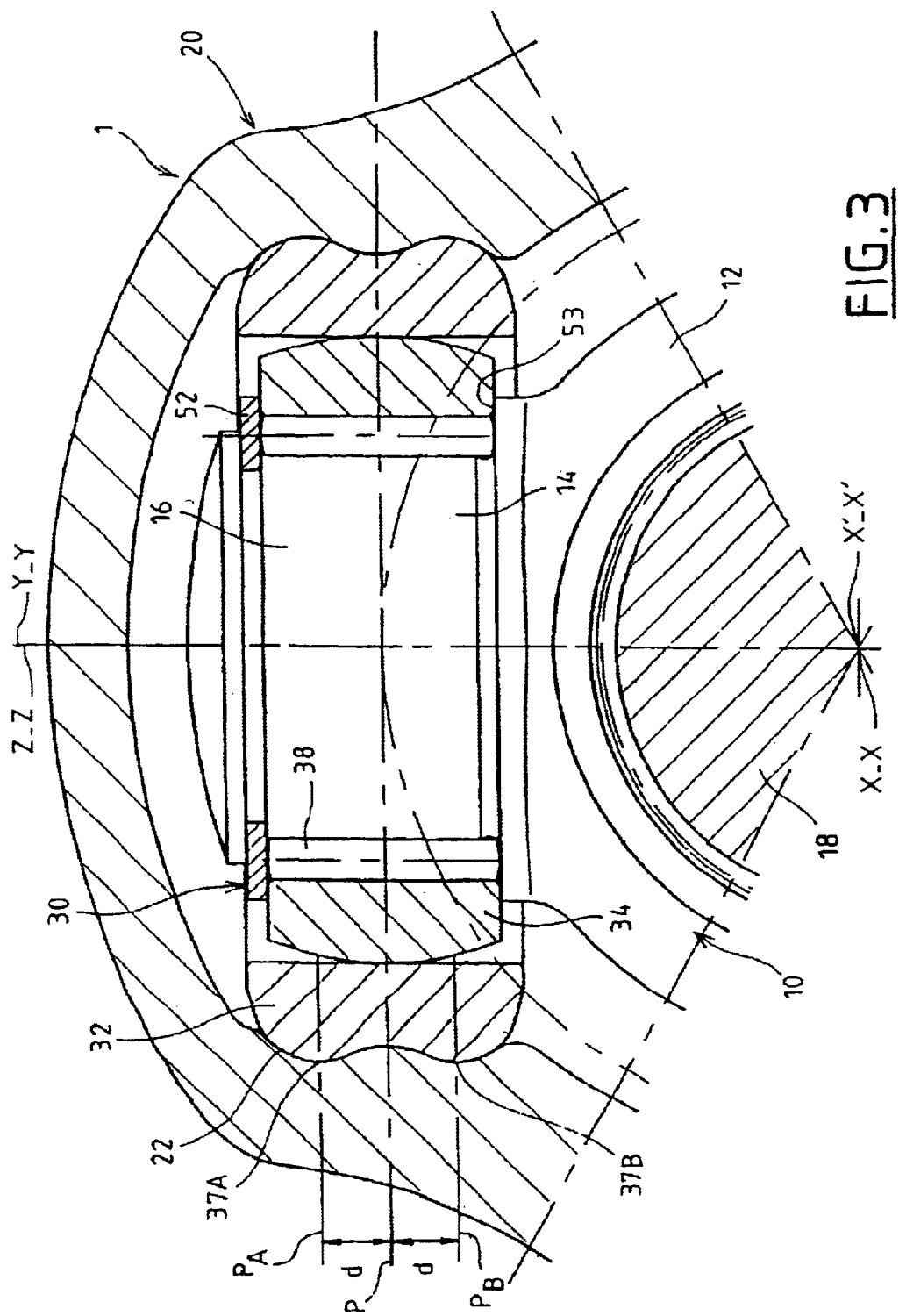

FIG. 3 shows a third embodiment of a joint 103 of the invention, which differs from that shown in FIG. 2 by the following elements only.

Firstly, the mechanical transmission member 230 comprises not only the above-described coupling mechanism for coupling the ring 134 to the arm 114, but also a split bearing washer 52 partially received in an annular groove adjacent to the end of the trunnion 116 situated on the outside of the joint. The trunnion 116 also has a shoulder 53 adjacent its end situated on the inside of the joint. This shoulder 53 and the washer 52 are located at opposite ends of the circular set of needles 38 and of the ring 134.

Thus, ignoring operating clearances, only relative rotation about the axis Y—Y is possible between the arm 114 and the ring 134.

Furthermore, the inside surface of the outer roller 232 is cylindrical about the axis Z—Z, thus allowing the inner ring 134 to perform, via its spherical outside surface, both sliding and swiveling motion about the axis Z—Z relative to the roller 232.

This embodiment operates analogously to that described above. The force T to be transmitted from the arm 114 is applied to the outer roller 232 via the zone of contact that the inner ring 134 maintains with the roller 232.

Then, as in the preceding embodiment, the point of application of the radial component $T_R$ of the force transmitted to the outer roller 232 remains permanently between the planes $P_A$ and $P_B$, with the axial component $T_A$ being taken up by the two contact zones 237A and 237B.

Figure 4:
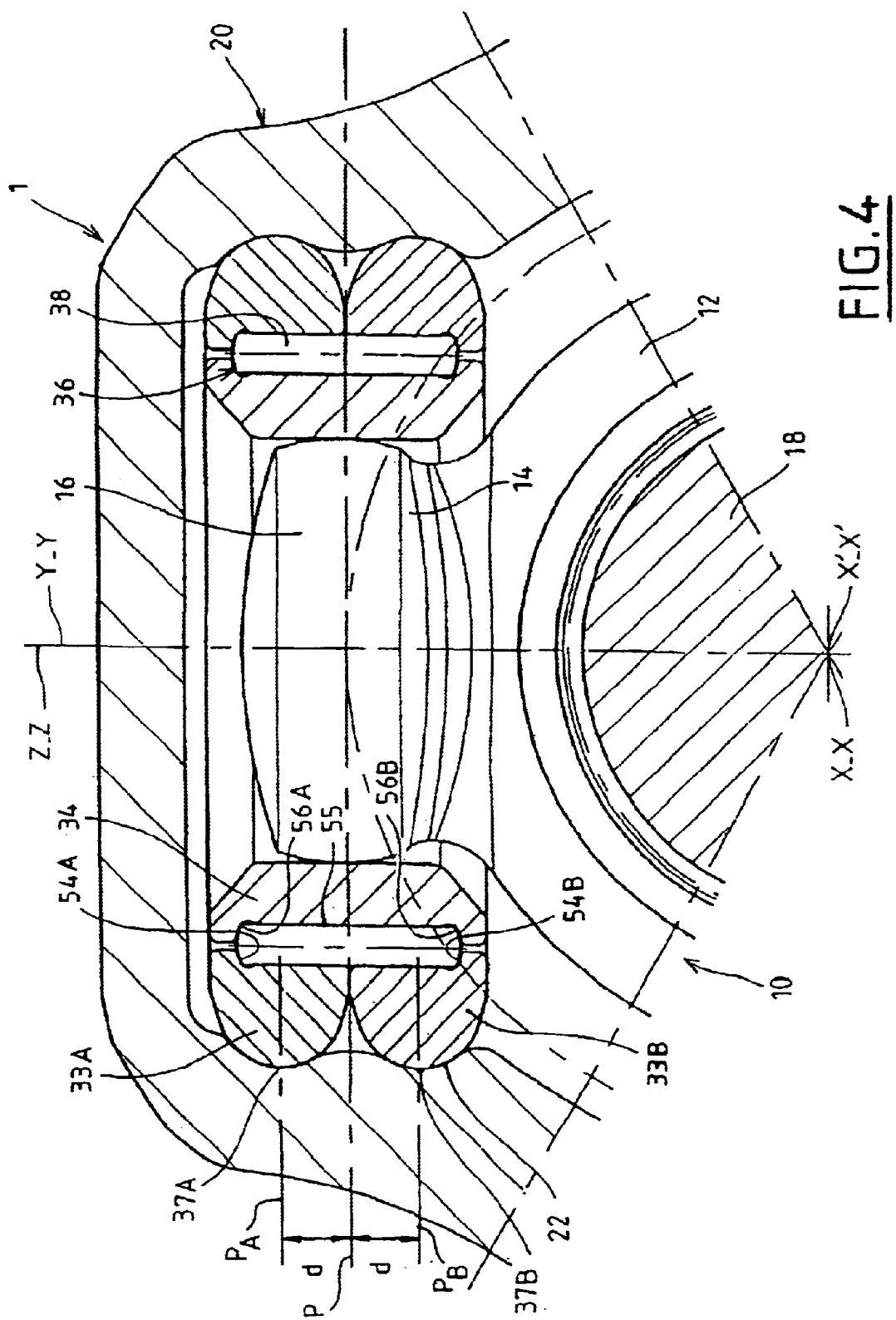

FIG. 4 shows a fourth embodiment of a constant velocity joint 104 of the invention which differs from the first embodiment shown in FIG. 1, as follows.

The outer roller 232 is constituted by two juxtaposed halves 33A and 33B that are symmetrical about the plane P.

Advantageously, and as shown in FIG. 4, the inside surface of each half 33A, 33B presents a respective inwardly-projecting shoulder 54A, 54B. When the two halves 33A and 33B are juxtaposed to form a complete outer roller, the two shoulders 54A, 54B define a cavity for receiving the coupling mechanism 36, in this case constituted by a circular set of needles 38.

The inner ring 334 is held axially relative to the axis Z—Z by the set of needles 38 being received in the outside surface of the ring 334 which outside surface presents a cavity 55 that is complementary in shape to the inside surface of the set of needles 38, having two radially outwardly directed end shoulders 56A and 56B.

This structure provides the same degrees of freedom and limitations on movement between the transmission member 330 and the arm 14 as in the first embodiment, and the joint 104 operates identically.

The joint 104 in this fourth embodiment presents an additional advantage since its coupling mechanism 36 does not require any washers, the inner ring 334 being held axially relative to the axis Z—Z directly by the set of needles 38 being received in the cavity 55, said set of needles itself being held axially by the juxtaposed assembly of the two halves 33A and 338 forming the outer roller.

Finally, it should be observed that the outside profile of the outer roller 32, 132, 232, 332 appears in all of the figures as being symmetrical about the midplane P of the roller, however that is not a requirement. It is also possible to envisage a roller that is asymmetrical.

What is claimed is:

1. A constant velocity transmission joint comprising:
    a male element having a plurality of arms;
    a female element defining a pair of facing tracks for each arm, said pair of tracks defining a longitudinal direction and said tracks are being situated on opposite sides of said arm; and,
    mounted on each arm, a mechanical transmission member movable along the longitudinal direction of said pair of tracks, being held axially by said tracks and establishing a connection with said arm that is swiveling and axially movable along an axis of the arm, said transmission member including a circularly symmetrical outer roller having a roller axis and disposed between the corresponding tracks to roll on one or the other of said tracks in direct contact therewith;
    wherein, for each arm, an outside profile in meridian half-section of the outer roller comprises two arcs having arcs both being concave or convex and cooperating with two substantially complementary arcs of the associated track to form two spaced-apart contact zones, each contact zone defining a contact resultant that is substantially perpendicular to the roller axis, such that the cooperating roller arcs and track arcs prevent the outer roller from tilting, relative to the tracks, about the longitudinal direction of the pair of tracks.

2. A joint according to claim 1, wherein the two arcs of the roller are convex.

3. A joint according to claim 1, wherein the arcs of the roller are circular arcs.

4. A joint according to claim 1, wherein the outside profile of the roller is symmetrical about a midplane of the roller.

5. A joint according to claim 1, wherein the transmission member comprises an inner ring disposed inside the outer roller and a coupling mechanism coupling the outer roller and the inner ring together, the coupling mechanism allowing only relative rotation between the outer roller and the inner ring about the roller axis, and wherein the inner ring is mounted to swivel and slide relative to the arm.

6. A joint according to claim 5, wherein the outer roller comprises two juxtaposed portions each presenting in meridian half-section an outside profile which defines one of said two arcs of the outer roller, and wherein each portion of the outer roller includes an inwardly-directed end shoulder on its inside face about the axis of the roller, the two shoulders defining between them a cavity for receiving the coupling mechanism.

7. A joint according to claim 1, wherein the transmission member comprises an inner ring mounted to swivel inside the outer roller.

8. A joint according to claim 7, wherein the inner ring is mounted to slide on the arm along their common axis of revolution, and wherein an inside surface of the roller and an outside surface of the ring are spherical and substantially complementary.

9. A joint according to claim 7, wherein the inner ring is slidable relative to the outer roller along the axis of revolution of the roller, and wherein the inner ring is prevented from moving axially relative to the arm.

10. A joint according to claim 1, wherein the outer roller comprises two juxtaposed portions each presenting in meridian half-section an outside profile which defines one of said two arcs of the outer roller.

11. A joint according to claim 1, wherein the arcs of the roller are convex, circular arcs and the complementary arcs of the arcs of the associated track are concave, circular arcs.

12. A joint according to claim 11 wherein the arcs of the toiler have equal radii and the arcs of the associated track have equal radii and wherein the arcs of the roller each have a smaller radius than the corresponding arcs of the associated track.

* * * * *